United States Patent [19]

Dornier

[11] Patent Number: 5,646,535
[45] Date of Patent: Jul. 8, 1997

[54] DIAGNOSTIC DISPLAY USING FRONT PANEL LEDS

[75] Inventor: Pascal Dornier, Sunnyvale, Calif.

[73] Assignee: Elonex Ip Hudings, Ltd., London, United Kingdom

[21] Appl. No.: 373,017

[22] Filed: Jan. 17, 1995

[51] Int. Cl.$^6$ ................................................. G01R 31/02
[52] U.S. Cl. ................................................. 324/556; 324/133
[58] Field of Search ................................. 324/556, 133, 324/158.1; 340/815.03

[56] References Cited

U.S. PATENT DOCUMENTS

| | | | |
|---|---|---|---|
| 3,838,339 | 9/1974 | Brandt | 324/133 |
| 4,439,156 | 4/1984 | Marshall et al. | 434/12 |
| 4,550,287 | 10/1985 | Babcock | 324/133 |
| 4,825,150 | 4/1989 | Sirasud | 324/133 |
| 4,837,565 | 6/1989 | White | 340/815.03 |
| 5,066,929 | 11/1991 | Frantz | 340/815.03 |

*Primary Examiner*—Ernest F. Karlsen
*Attorney, Agent, or Firm*—Donald R. Boys

[57] ABSTRACT

A computer system has dual-color LEDs for the LEDs conventionally indicating power on and hard disk drive activity, and a control circuit drives the LEDs in on-off and color combinations to indicate diagnostic information. In a preferred embodiment, a control circuit for controlling the LEDs is addressable as a port, and state combinations of the LEDs are set according to data sent to the port address of the control circuit. Also in a preferred embodiment, a POST routine for the computer system is divided into specific tests and groups of tests by commands configured to write a specific data string to a port address depending upon the position of the control command in the POST routine.

3 Claims, 9 Drawing Sheets

Example BIOS POST Routine

Power On - Port 0460h is default 1111

Begin BIOS POST Routine

Write 1010 to port 0460h

1
HOOK_00 (cold boot entry) - CHIPSET INITIALIZATION,
MEMORY ABD CACHE AUTOSCAN CONFIG.
SETUP 4G SEGMENT LIMITS — Memory Board #1

DISABLE VIDEO SIGNAL
RESET DMAs
DISABLE FLOPPY
SHUT OFF SPEAKER

Write 1011 to port 0460h

2 ROM BIOS CHECKSUM

Write 1011 to port 0460h — BIOS Failure

3
TEST PAGE REGISTERS

8042 SELFTEST
INIT DMA, 8254, RTC, 8259 — Memory Board #2

HOOK_01 (warm boot entry) - DISABLE CACHE, SHADOW,
REMAP, SET CPU SPEED TO HIGH, RESET THE WAIT STATES / ETC
CHIPSET REGS BACK TO DEFAULT, THE MEMORY CONFIGURATION
REGS ARE LEFT ALONE, SINCE THE CONFIG IS DETERMINED ONLY AT POWERUP.

CONFIRM REFRESH TOGGLE IN PORT #61H

TEST DMA CONTROLLERS

Write 1000 to port 0460h

4
TEST LOW 64K MEMORY BANK, SET REAL STACK

TEST 8259s MASK REG. — DRAM Failure

TEST 8259s INTERRUPT RANGE, PURGE POWERUP INTS,
AND TEST CONNECTION TO THE OUTSIDE WORLD, INCLUDING
IRQ0 TIMER0.
NOTE: SIDE EFFECT OF THIS PROC. IS TO INIT TIMER0
SET INTERRUPT VECTORS

CONFIRM THAT 8264 CHANNEL0 (SYS TICK) IS UPDATING

Write 1110 to port 0460h

*Fig. 3A*

5
- TEST SPEAKER CIRCUITRY, 8254 CHANNEL 2.
- INIT CMOS REGB AND REGC, PERFORM A WRITE/READ TEST OF ALL NONVOLATILE CMOS RAM LOCATIONS.
- TEST THE PERIODIC INTERRUPT FUNCTION.
- CHECK A20 STILL ON, DETERMINE CPU VIA RESET
- HOOK_02 - SET AT-BUS SPEED AND DRAM TIMING ACCORDING TO THE CPU OSC.

Memory Board #3

WRITE 1101 TO PORT 0460H

6  VIDEO INITIALIZATION

Video

WRITE 1100 TO PORT 0460H

7
- CHECKSUM CMOS
- DISPLAY SIGNON MESSAGE, INIT KB, BOOT DELAY RESET WD CARD (cold boot only)
- SIZE AND TEST BASE MEMORY (LOW 64K ALREADY DONE)
- IF KB DIDN'T LOG IN DURING FIRST ATTEMPT, TRY AGAIN
- HOOK_03 - INIT MULTI-CHIP (IF PRESENT)
- SIZE AND TEST CACHE
- TEST A20 ON/OFF BEHAVIOR
- SIZE AND TEST EXTENDED MEMORY
- SIZE AND TEST SYSTEM MEMORY
- DETERMINE IF PS2 MOUSE HOOKED UP Memory Board #4

Memory Test

WRITE 0110 TO PORT 0460H

*Fig. 3B*

8
- TEST THE RTC UPDATE-IN-PROGRESS OPERATION, AND VALIDATE THE CURRENT RTC TIME.
- DETERMINE AND INIT SERIAL PORTS
- DETERMINE AND INIT PARALLEL PORTS
- DETERMINE AND FINIT COPROCESSOR
- DETERMINE FLOPPY PORT PRESENCE, AND VALIDATE CMOS FIXED DISK ENTRIES.
- CHECK (AND DISPLAY) CONFIGURATION CHANGES VALIDATE CMOS

Memory Board #5

WRITE 0111 TO PORT 0460H

9
- ACKNOWLEDGE ERRORS, CHECK IF KB IS LOCKED
- SECURITY CLEARANCE, ENTER (BYPASS) SETUP UTILITY AUTODETECT IDE PARAMETERS (IF ENABLED)
- SET THE SERIAL/PARALLEL PORTS THE WAY THE USER WANTS DOS TO SEE THEM.
- PROGRAM THE KEYBOARD REPEAT RATE ACCORDING TO USER'S PARAMETERS
- INIT CYRIX CPU
  HOOK_06 - SET SPEED, CACHE, AND SHADOW, ACCORDING TO CMOS.
  NPX TRAP: ENABLE EM_BIT PER CMOS

Setup

WRITE 0100 TO PORT 0460H

10
- INITIALIZE FLOPPY SUBSYSTEM.
- INITIALIZE FIXED DISK SUBSYSTEM
- SET THE VIDEO MODE FOR THE PRIMARY ADAPTER.
  RESTORE RUN-TIME INTO5 (PRTSC) HANDLER.

Drives

WRITE 0010 TO PORT 0460H

*Fig. 3C*

11
```
SET FINAL STACK
SHUT OFF A20-GATE.
CLEAR RAM 0:500 THRO 0:7000
SET 64K SEGMENT LIMITS (MIGHT BE SET TO 4G IN HOOK_00)
INSTALL C800_E000 ADAPTER ROMS

ACKNOWLEDGE ROM INSTALLATION ERRORS
CLEAR SCREEN
SET THE DOS TIMER VARIABLE 40:6C

ENABLE NMI AND LATCH.

SET FINAL STACK
INSTALL E000 ROM

ACKNOWLEDGE E000 ROM INSTALLATION ERRORS

SET FAST A_20 PER CMOS_BUGFIX

INIT EMS (IF ENABLED)
INIT APM (IF ENABLED)
```

Memory Board #6

WRITE 0001 TO PORT 0460H

12 INT19

BOOT
NORMAL LED STATUS

*Fig. 3D*

E-Mail Temp Batch Template

Port Addresses Vs. LED State Combinations

| XD3 | XD2 | XD1 | XD0 | LED25 | LED23 |
|---|---|---|---|---|---|
| 0 | 0 | 0 | 0 | Off | Off |
| 0 | 0 | 0 | 1 | Off | Green |
| 0 | 0 | 1 | 0 | Off | Red |
| 0 | 0 | 1 | 1 | Off | Yellow |
| 0 | 1 | 0 | 0 | Green | Off |
| 0 | 1 | 0 | 1 | Green | Green |
| 0 | 1 | 1 | 0 | Green | Red |
| 0 | 1 | 1 | 1 | Green | Yellow |
| 1 | 0 | 0 | 0 | Red | Off |
| 1 | 0 | 0 | 1 | Red | Green |
| 1 | 0 | 1 | 0 | Red | Red |
| 1 | 0 | 1 | 1 | Red | Yellow |
| 1 | 1 | 0 | 0 | Yellow | Off |
| 1 | 1 | 0 | 1 | Yellow | Green |
| 1 | 1 | 1 | 0 | Yellow | Red |
| 1 | 1 | 1 | 1 | Yellow | Yellow |

*Fig. 5*

DIAGNOSTIC DISPLAY USING FRONT PANEL LEDS

FIELD OF THE INVENTION

The present invention is in the area of computer diagnostics, and relates specifically to displaying progress of power-on self testing for by use of LEDs typically already available on a computer front panel.

BACKGROUND OF THE INVENTION

Error conditions in computer power-up and operating procedures are conventionally indicated by one or both of audio tones provided through a speaker and messages written to the screen of a connected video monitor. For example, most basic input output (BIOS) systems for IBM compatible systems are configured to provide a beep tone if a portion of a power on self test (POST) routine is failed. As another example, most computers have pre-stored error messages that are accessed and displayed if certain error conditions are encountered.

Beyond beep tones and pre-stored error messages written to a display, many current art systems make more detailed information available to a user by writing to an I/O port, typically port 0080h. Such detailed information may be accessed by a user by installation of a special expansion card called a POST card. Installation of a POST card, however, requires removing the computer's cover and installing the card in one of the expansion slots typically provided within the computer's body. The installation and configuration of expansion cards is a task beyond the scope of most computer users.

A more user-friendly way to indicate error conditions without the need for additional software or hardware is needed. Such a system could be provided as a part of a computer's BIOS, or an extension of the BIOS, and should use existing hardware for indicating error conditions to a user.

SUMMARY OF THE INVENTION

In a preferred embodiment of the present invention, a method is provided for displaying diagnostic information in operation of a computer system. The method comprises steps of (a) detecting an error in operation; and (b) setting on-off and color states of two or more LEDs observable by a user in a combination indicating the error. In one embodiment the error detected is a failure to complete a specific test or group of tests in execution of a power on self test (POST) procedure in initializing the computer.

In a preferred embodiment as well, the LEDs used are dual-color LEDs that may be illuminated in red, green or yellow, and may also be off (not illuminated). These are actually 4-state LEDs. The LEDs are placed in the usual position for the conventional LEDs that are used in most personal computers for indicating power on and hard disk activity. In practicing the present invention in this embodiment, the LEDs are still used for the conventional purpose during normal operation, but are also used in state combination of one or both LEDs to indicate specific error conditions during POST.

In the embodiment wherein the LEDs are used to indicate performance of a POST routine, the POST routine is divided into specific tests and groups of tests, and a control command is placed between the specific tests and groups of tests for changing the state combination of the LEDs. The mechanism for controlling the LEDs is a control circuit configured with port addressable circuitry whereby a digital value may be sent specific to an error condition. The control circuit sets the LED state combination in response to the specific digital value received.

The system of the invention in the embodiment integrated with a POST routine not only allows a user to follow, by the on-off and color states of the dual-color LEDs, the execution of the different parts of the POST routine, but in the event of a failure of a test in the POST routine, since most systems are configured to stop on a failure, allows the user to know where in the POST routine the failure occurred.

Displaying error conditions by state combinations of multiple LEDs as in the present invention is generally quicker and less expensive than by conventional methods, such as on an alphanumeric display, as is done on PAckard Bell™ and Everex™ systems, and no extra hardware or extensive software is needed.

BRIEF DESCRIPTION OF THE DRAWINGS

FIG. 3A is a first portion of an example listing of a BIOS POST routine according to an embodiment of the present invention.

FIG. 3B is a second portion of the example listing of a BIOS POST routine, continuing from FIG. 3A.

FIG. 3C is a third portion of the example listing of a BIOS POST routine, continuing from FIG. 3B.

FIG. 3D is a fourth portion of the example listing of a BIOS POST routine, continuing from FIG. 3C.

FIG. 5 is a summary of the values written to port 0460h and the LED states resulting.

DESCRIPTION OF THE PREFERRED EMBODIMENTS

Figure 1:
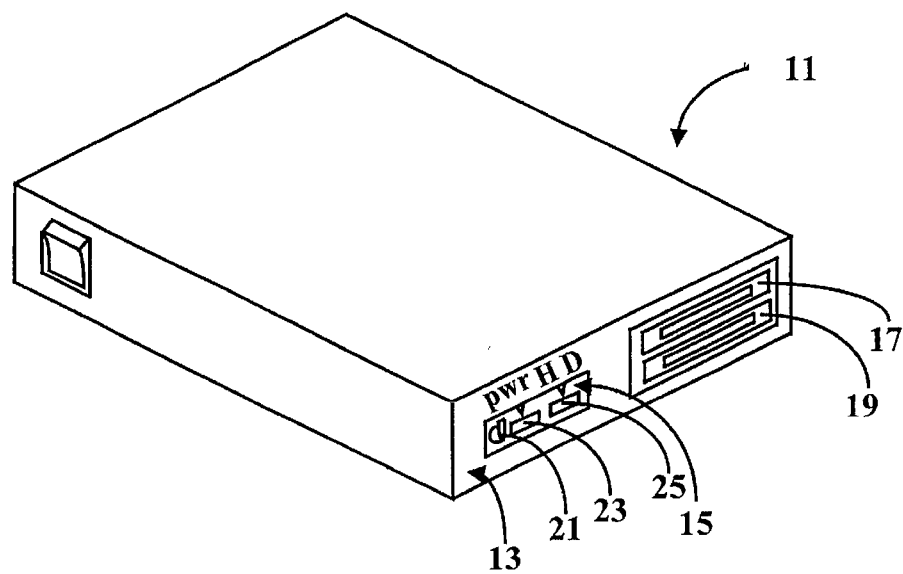
FIG. 1 is a simplified isometric drawing of a personal computer front panel, using dual-color LEDs according to the present invention.

FIG. 1 is a simplified isometric view of a personal computer 11 having a front panel 13 which includes an LED indicator area 15, a 5¼ inch floppy drive 17, and a 3½ floppy drive 19. Area 15 comprises a keylock switch 21, by which a user may enable power on to the computer, a first LED 23 for indicating power is on or off, and a second LED 25 for indicating hard disk activity. In this embodiment both LEDs are tri-state LEDS, known in the art, which may be illuminated green, red, or yellow.

In the embodiment described herein with reference to FIG. 1, LED 23 is lighted green when power is on, and off when power is off. LED 25 is lighted green when the hard disk is running, and off when the hard disk is not running. This indicator operation is conventional practice for most personal computers.

Figure 2:
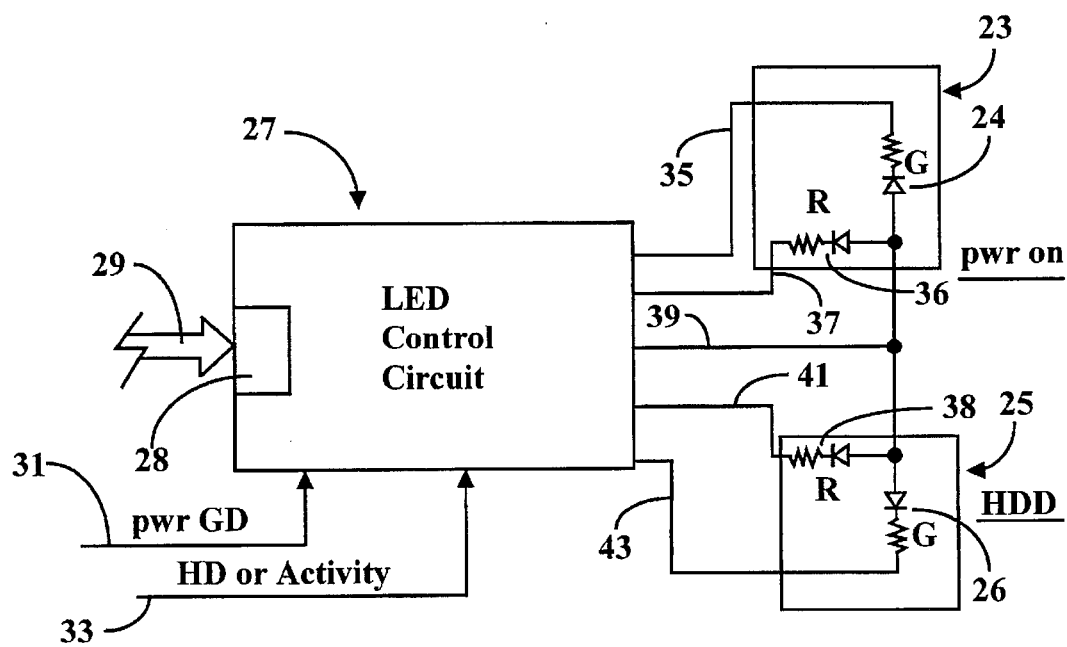
FIG. 2 is a block diagram showing a control circuit for lighting tri-state LEDs according to a 4-bit value written to port 0460h.

FIG. 2 shows a control circuit 27 as a block in a block diagram. Circuit 27 is for controlling the on state and color of LEDs 23 and 25 shown on the front panel of computer 11 in FIG. 1, and is positioned inside the computer case. Control circuit 27 is configured with circuitry forming an addressable port (circuitry 28), as is known in the art, and is addressed as port 0460h in the present embodiment.

Control circuit 27 in this embodiment has a bus interface to system bus 29, a "power good" input 31, and a hard drive "activity" input 33. Input 31 is "on" or "high" when power is on to the computer, and input 33 is active low when the hard disk drive is active.

Control circuit 27 has 5 output lines. Line 39 provides a common anode for each of tri-state LEDs 23 and 25. LED 23 is the Power On indicator conventionally (see FIG. 1), and LED 25 is the hard disk drive (HDD) activity indicator. Each of the tri-state LEDs has a separate cathode for red and green, with a separate control line. For LED 23, cathode 24 activated by output line 35 from control circuit 27 provides green for LED 23. Cathode 36 activated by output line 37 from control circuit 27 provides red for LED 23. In the case of red or green, the opposite cathode must be off. Activating both cathodes illuminated LED 23 yellow. Similarly, activating cathode 38 via line 41 illuminates LED 25 red, and activating cathode 26 via line 43 illuminates LED 25 green (with the opposite cathode off in each case. Activating both cathodes 26 and 38 illuminates LED 25 yellow.

By using tri-state LEDs for the traditional power and hard disk activity LEDs, there are sixteen combinations (including LED off) of colors on off state that may be displayed, hence sixteen messages may be conveyed, rather than the two indications that are normally made, those being hard disk activity and power on.

In a preferred embodiment the LEDs are used lighted (or not) in various available combinations in part in response to successful completion of selected sections of the POST routine in the system BIOS. Some few other indications, for example an indication of a standby state for power-managed computers, is made in addition to the indications from the POST routine.

Detail of the circuitry of circuit 27 is not provided herein, as implementation of the circuitry within block 27, once the requirement for lighting the LEDs in different state combinations in response to data transmitted to the port address is known, is well within the ability of those with skill in the art, given the controlling inputs as described herein.

FIG. 3A is a first portion of a listing of an example POST routine according to the present invention, including control statements for writing to port 0460h for controlling the status of LEDs 23 and 25. The example listing is continued in FIGS. 3B, 3C, and 3D. As may be seen in FIGS. 3A, 3B, 3C, and 3D, the activities of the BIOS routine in the POST portion are divided into (for example) twelve coherent groups, and between groups of activities the LED states are altered. For example, before ROM BIOS checksum, the value written to port 0460h is 1011, which, through circuit 27, as will be described below, sets LED 23 yellow and LED 25 red. After (and if) the BIOS checksum is successfully completed, the value written is 1001, which sets power LED 23 green and HDD LED 25 red.

It is typical of most BIOS routines that further activity ceases if a POST test is unsuccessful. Hence, if the LED status remains LED 23 yellow and LED 25 red, the user will know the BIOS checksum failed, which will be valuable diagnostic information.

Figure 4A:
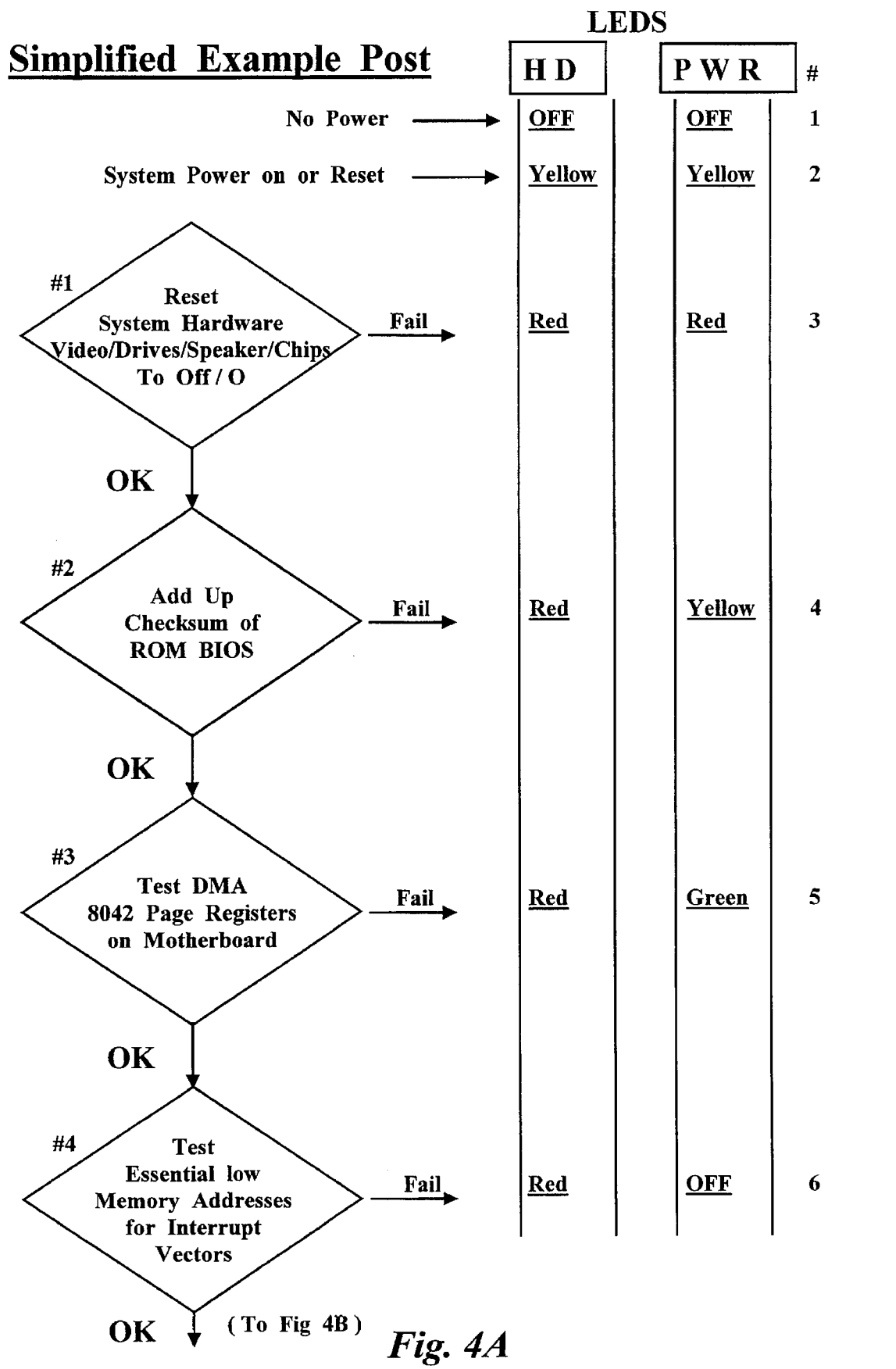
FIG. 4A is a first portion of a flow diagram representing a POST operation according to the invention, also showing all LED states.

FIG. 4A is a first portion of flow diagram of an example POST routine, based substantially on the listing of FIGS. 3A, 3B, 3C, and 3D. The state of the LEDs initiated as a result of the control statements to write to port 0460h, which will remain in the instance of failure of any portion of the POST, are indicated in columns to the right of each step in the flow diagram. All sixteen states of the LEDs are indicated.

At the beginning there is no power and the LEDs are both off. At power on, or reset, both LEDS are turned on yellow by default. Then the BIOS POST routine begins. If the system board is dead, the yellow/yellow LED condition will remain.

Figure 4B:
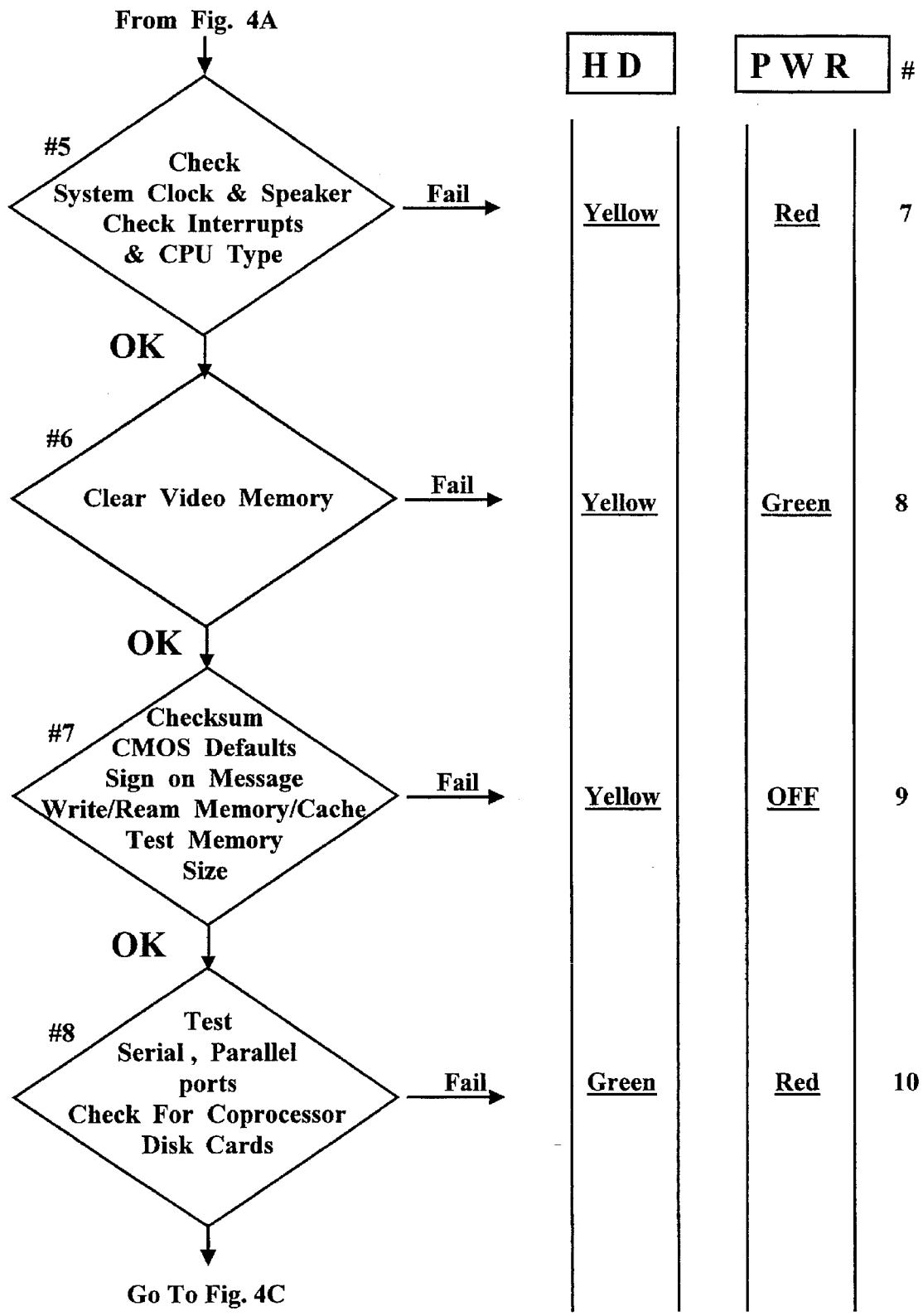
FIG. 4B is a second portion of the flow diagram of FIG. 4A.
Figure 4C:
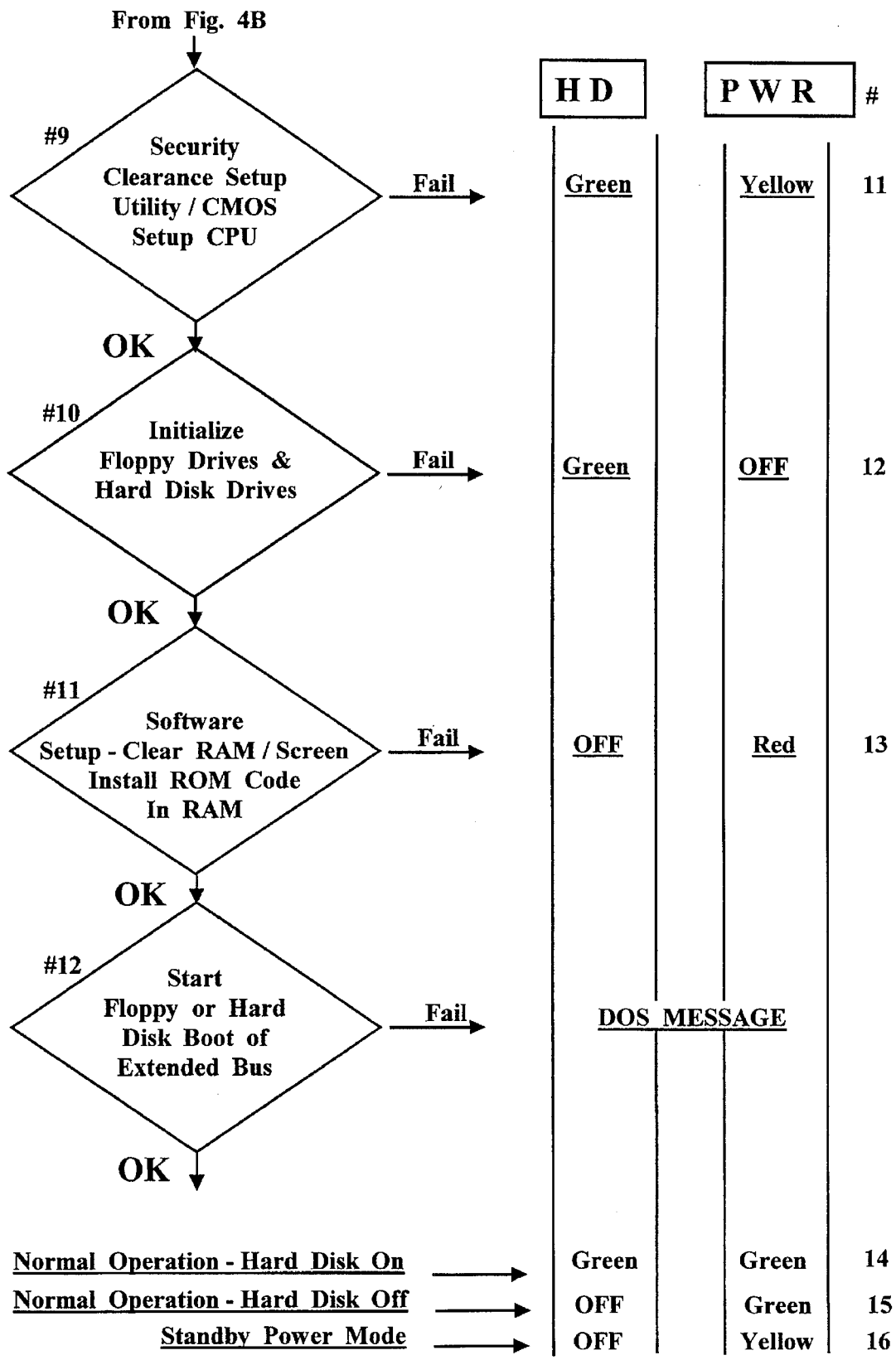
FIG. 4C is a third portion of the flow diagram of FIGS. 4A and 4B.

In FIGS. 4A, 4B, and 4C, each of the activity groups in the POST routine is indicated as a step with a step number by the triangle indicating the step. In the event of a failure at any step the LED status is indicated to the right of each step. The sixteen states for the two tri-state LEDs are indicated at the far right.

At the end of the POST routine, BOOT is initiated, and if successfully completed, a state of normal operation is entered. For this state, the value to port 0460h is 0001, setting the LEDs to Off/Green. In this normal state, whenever the hard disk drive is active, the HDD LED will also be turned on green, to follow conventional operation.

It is becoming more common for computer systems to include power management. In the event of power management, there is typically a low power standby state that is entered either by operator input or by a time-out without input activity. In one embodiment of the present invention the LED combination of Off/Yellow is reserved to indicate standby mode, as is shown as the sixteenth state in FIG. 4C.

In the embodiment described with reference to FIGS. 3A, B, C, and D, and 4A, B, and C, the conditions reported are both performance of and failures in the POST routine. For example, if the POST routine operates normally, and there are no errors detected, the states of the LEDs will change as each command is executed that causes a write to port 0460h. Since these commands are interspersed at points in the POST routine between selected groups of tests in the routine, the continued changing of the on-off and color combinations of the LEDs indicates that the routine is proceeding normally. Moreover, the particular combination of on-off and color at any particular time, indicates the particular group of tests in progress.

If any test is failed in the POST routine, the routine is halted at that point, and the on-off and color status of the LEDs will not change further. An operator may then consult a reference to know where the POST routine halted, and may use that diagnostic information to further repair or other correction of whatever problem caused the failure in the POST routine. The reference may be a simple table of on-off and color states for the LEDs related to the error conditions they represent.

FIG. 5 is provided for reference, relating the 4-bit values written to port 0460h in the embodiments described above, with the LED state combinations produced by circuit 27 (FIG. 2) in response.

It will be apparent to those with skill in the art that there are many alteration that might be made without departing from the spirit and scope of the invention. For example, many other error conditions may be indicated by controlling the on-off and color status of the LEDs that conventionally indicate power on and hard disk operation. Error conditions that are related to system operation after boot may also be indicated. For example, a memory failure, a read-write failure, a failure in a printing operation, and any other detectable failure that conventionally may be indicated by a message on a computer's video monitor may be indicated as well, or instead, by controlling the LED states.

It is not mutually exclusive to use the tri-state LEDS in a manner of practicing the present invention for errors that occur in operation after a successful boot or for steps in the POST routine. The same combinations that mean one thing during the POST routine may be used for an entirely different meaning during further operation, because it will be clear to an operator whether a successful boot was completed. In fact, the set of sixteen combinations available with two tri-state LEDs can be reused for an entirely different set of meanings any time a recognizable mode of operation changes.

The use of dual-color, or even single-color LEDs for diagnostic indications is not limited to existing LEDs, such as the hard disk drive and power on LEDs as described above in a preferred embodiment. Separate LEDs may be implemented on the front panel or elsewhere to indicate error conditions as well. The use of the existing LED positions, however, is convenient.

In another embodiment more than two LEDs may be used, increasing the number of combinations of off-on and color states that may be set, and consequently the number of diagnostic conditions that may be displayed. In yet another embodiment, the number of states that may be indicated is increased by adding control circuitry to cause one or more of LEDs to alternate on and off. Alternating between colors may be used as well.

What is claimed is:

1. A method for indicating state of completion of test procedures in a power on self test (POST) routine, comprising steps of:

(a) dividing the POST routine into discrete tests and groups of tests;

(b) inserting a control command into the post routine between one and another of the discrete tests and groups of tests, the control command configured to cause a write of a unique digital value to a port address;

(c) controlling the on-off and color state of two or more LEDs observable by a user in a combination to indicate the unique digital value.

2. The method of claim 1 wherein, in step (c), a control circuit configured to control set the on-off and color states of the LEDs is addressable by the port address, and also configured to set the combination of states of the LEDs in response to the unique digital value.

3. The method of claim 1 wherein the LEDs are two tri-state LEDs mounted on a front panel of the computer, one also indicating power on and the other also indicating hard disk drive activity.

* * * * *